United States Patent
Poupinet et al.

(10) Patent No.: US 7,903,536 B2
(45) Date of Patent: Mar. 8, 2011

(54) IRREVERSIBLE OPTICAL RECORDING MEDIUM BY FORMATION OF BUBBLES HAVING A HEIGHT LIMITED BY THE GAS SOURCE GENERATING THEM

(75) Inventors: Ludovic Poupinet, Sassenage (FR); Jerome Hazart, Grenoble (FR); Berangere Hyot, Eybens (FR); Marc Plissonnier, Eybens (FR)

(73) Assignees: Commissariat a l'Energie Atomique, Paris (FR); MPO International, Averton (FR)

( * ) Notice: Subject to any disclaimer, the term of this patent is extended or adjusted under 35 U.S.C. 154(b) by 802 days.

(21) Appl. No.: 11/885,171

(22) PCT Filed: Mar. 23, 2006

(86) PCT No.: PCT/FR2006/000649
§ 371 (c)(1),
(2), (4) Date: Aug. 28, 2007

(87) PCT Pub. No.: WO2006/103340
PCT Pub. Date: Oct. 5, 2006

(65) Prior Publication Data
US 2008/0267048 A1    Oct. 30, 2008

(30) Foreign Application Priority Data
Mar. 29, 2005 (FR) .................................... 05 03032

(51) Int. Cl.
*G11B 7/24* (2006.01)
(52) U.S. Cl. ......................................... 369/283
(58) Field of Classification Search ................ 428/64.1; 369/283
See application file for complete search history.

(56) References Cited

U.S. PATENT DOCUMENTS

| | | | |
|---|---|---|---|
| 4,577,291 A | | 3/1986 | Cornet |
| 5,401,609 A | * | 3/1995 | Haratani et al. ......... 430/270.12 |
| 6,033,752 A | * | 3/2000 | Suzuki et al. ................. 428/64.1 |
| 2006/0182924 A1 | | 8/2006 | Cornu et al. |
| 2007/0030776 A1 | * | 2/2007 | Kim et al. ..................... 369/47.1 |

FOREIGN PATENT DOCUMENTS

| EP | 0 536 406 A1 | 4/1993 |
|---|---|---|
| JP | A-56-127937 | 10/1981 |
| JP | A 60-34896 | 2/1985 |
| JP | A 62-281133 | 12/1987 |
| JP | A-1-101190 | 4/1989 |
| JP | A-3-120636 | 5/1991 |
| WO | WO 2005/010876 A2 | 2/2005 |

* cited by examiner

*Primary Examiner* — Mark Blouin
(74) *Attorney, Agent, or Firm* — Oliff & Berridge, PLC

(57) ABSTRACT

An irreversible optical recording medium comprises at least an active layer presenting a rear face and a front face designed to receive at least an optical writing radiation. The optical writing radiation enables gas bubbles forming write marks to be formed locally in said active layer by means of a layer forming a gas source arranged on the rear face of the active layer. The layer forming the gas source moreover has a thickness less than or equal to 100 nm so as to limit the height of the bubbles formed in the active layer and therefore to improve tracking when read operations are performed. The layer forming the gas source is preferably made of carbon-doped hydrogenated amorphous silicon oxide.

12 Claims, 4 Drawing Sheets

IRREVERSIBLE OPTICAL RECORDING MEDIUM BY FORMATION OF BUBBLES HAVING A HEIGHT LIMITED BY THE GAS SOURCE GENERATING THEM

BACKGROUND OF THE INVENTION

The invention concerns an irreversible optical recording medium comprising at least an active layer presenting a rear face and a front face designed to receive at least an optical writing radiation, said optical writing radiation enabling gas bubbles to be formed locally in said active layer by means of a layer forming a gas source arranged on the rear face of the active layer.

STATE OF THE ART

Optical recording, for example on CD-R (Compact Disc-Recordable) and DVD-R (Digital Versatile Disc-Recordable) type media, is in most cases performed by means of an active layer made of organic colorant material. The active layer is deposited on a plastic substrate and is covered by a reflective metal layer. Irreversible optical recording technologies in colorant materials do however present high production costs.

It has also been proposed to produce optical recording media by means of an active layer made of inorganic material. One of the most widely studied irreversible techniques consists in forming marks, in the form of holes, in the active layer by laser ablation. The presence of the mark then results in a local decrease of the reflection of a laser beam scanning the surface of the disc.

Another irreversible writing technique consists in forming marks in the form of bubbles in the active layer of inorganic material, generally by using an active layer able to deform locally under the effect of an optical writing radiation and of a gas source. The writing technique by formation of bubbles can however give rise to tracking problems after writing and therefore to difficulties in reading.

In recording media by formation of bubbles, tracking is in fact generally performed by means of a plastic substrate comprising a front face provided with a track in the form of a spiral. The front face of the substrate therefore generally comprises pit zones forming groove bounded by raised zones. The front face is covered by a semi-reflecting active layer able to undergo local deformations in the form of bubbles under the effect of a focused laser beam. Data recording is generally obtained by a laser beam coming from the rear face of the substrate and focused on the groove of the front face of the substrate. The laser beam being either totally or partially absorbed, it then causes a local temperature rise in the medium enabling the substrate to release gas. The gas released by the substrate then causes a local deformation, in the form of a bubble, in the active layer, preferably at the level of a pit zone of the front face of the substrate. As the substrate is relatively hard, the bubble constituting a write mark generally forms in the active layer on the opposite side from the substrate, at the level of a pit zone of the front face of the substrate.

In conventional optical media, however, a reading laser beam comes from the rear face of the substrate, and reading is obtained by means of a tracking control system, i.e. by following the groove formed by the pit zones of the front face (and therefore the raised zones for the reading laser beam). Moreover, the quality of tracking is sensitive to the mean of the level difference between the pit zones and the raised zones of the front face of the substrate. After a write operation, the mean of the level of the groove formed by the pit zones of the front face is substantially equal to the level of the raised zones, which handicaps tracking as it can no longer make the difference between the pit zones and the raised zones. Reading can then become difficult.

To remedy this problem, it has been proposed in Patent application WO-A-2005/010876 to perform the write and read operations through a protective layer, opposite the substrate comprising the track and comprising flat front and rear faces. Furthermore, a deformable layer designed to follow the deformations formed locally in the active layer is arranged between the active layer and the protective layer through which the optical write and/or read radiation passes. The bubbles are in addition preferably made at the level of the raised zones of the track so that, after a write operation, the level differences between the pit zones and the raised zones, respectively written and blank, are maximal. Tracking after writing is thus made easier.

However, the recording medium according to Patent application WO-A-2005/010876 still presents certain drawbacks. For a high writing power, the height of the bubbles can in fact prove to be too great. This can again give rise to disturbance of tracking and therefore to difficulties in reading. In addition, controlling the height of the bubbles can prove difficult to do, in particular when the writing strategy is limited.

OBJECT OF THE INVENTION

The object of the invention is to obtain an irreversible optical recording medium by formation of bubbles remedying the shortcomings according to the prior art and more particularly enabling a good tracking to be performed.

According to the invention, this object is achieved by the fact that the layer forming the gas source has a thickness less than or equal to 100 nm and is preferably made of carbon-doped hydrogenated amorphous silicon oxide.

According to a particular embodiment, the active layer is preferably arranged between a protective layer and a substrate comprising a free rear face and a front face provided with a track.

According to a first development of the invention, the layer forming the gas source is arranged between the front face of the substrate and the rear face of the active layer.

According to a second development of the invention, the layer forming the gas source is arranged between the rear face of the active layer and the protective layer.

BRIEF DESCRIPTION OF THE DRAWINGS

Other advantages and features will become more clearly apparent from the following description of particular embodiments of the invention given as non-restrictive examples only and represented in the accompanying drawings in which.

DESCRIPTION OF PARTICULAR EMBODIMENTS

Figure 1:
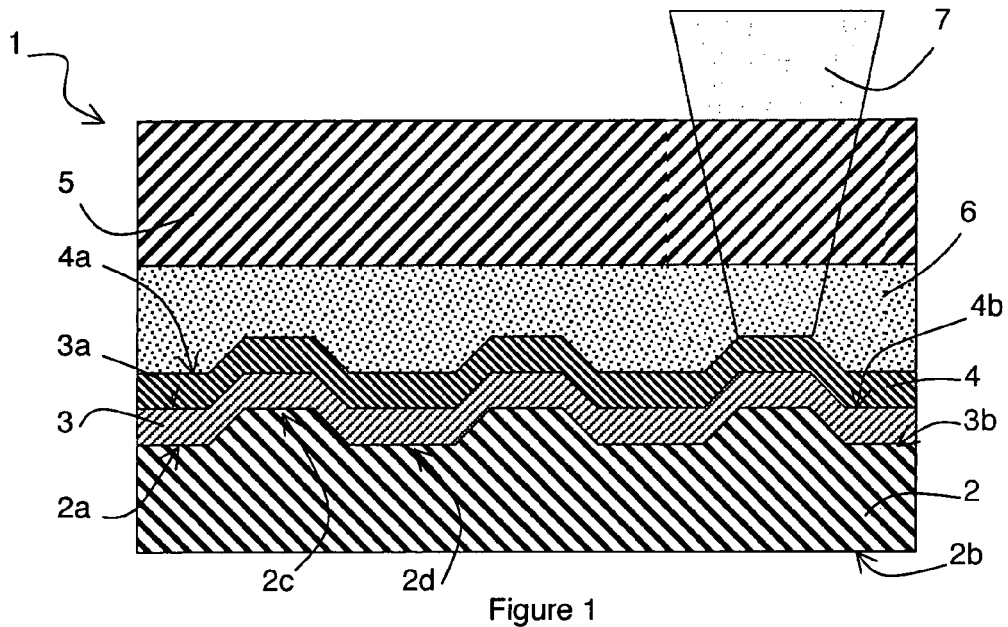
FIG. 1 schematically represents a first embodiment of an optical recording medium according to the invention, in cross-section, the layer forming the gas source being arranged between the active layer and the substrate provided with a track.

In a first embodiment represented in FIG. 1, an irreversible optical data recording medium 1 is formed by a stack of several superposed thin layers. The stack successively comprises a substrate 2, a layer 3 forming a gas source, an active layer 4 and a protective layer 5 fixed to the active layer 4 by an adhesive layer 6.

The substrate 2 has a front face 2a comprising a track, preferably in the form of a spiral, and a free rear face 2b. The front face 2a thus comprises raised zones 2c and pit zones 2d. As in the recording medium according to Patent application WO-A-2005/010876, the track of the front face 2a of the substrate is preferably formed by raised zones 2c.

Both the layer 3 forming the gas source and the active layer 4 preferably have a uniform thickness. They thus both comprise front faces 3a and 4a and rear faces 3b and 4b. The front faces 3a and 4a respectively of the layer 3 and of the active layer 4 then have the same geometry as that of the substrate 2.

The active layer 4 is a layer able to be deformed locally by the effect of an optical writing radiation 7. It is for example formed by a tellurium and tin alloy (SnTe) or by a tellurium and zinc alloy (ZnTe) or by a stack of two layers respectively of ZnTe and SnTe each with a thickness of 20 nm. The optical writing radiation 7 is received by the front face 4a of the active layer 4 and is preferably focused at the level of the part of the active layer 4 covering the track of the substrate, i.e. the raised zones 2c of the front face 2a of the substrate. When a data write operation is performed, the optical writing radiation 7 then causes a temperature rise in the recording medium. The temperature rise then enables the gas source arranged on the rear face 4b of the active layer 4 to locally release gas. The released gas then forms a gas bubble in the active layer 4 at the level of the part of the active layer 4 covering the track of the substrate. The bubble then constitutes a mark able to be read for example by an optical reading radiation.

The layer 3 forming the gas source has a thickness less than or equal to 100 nanometers (nm) and is preferably made of carbon-doped hydrogenated amorphous silicon oxide (noted SiCO:H). Such a layer 3 and more particularly the thickness thereof enables the quantity of gas released to be efficiently controlled. The small thickness of the layer 3 forming the gas source in fact enables the quantity of gas released to be controlled and gas bubbles of limited height to be obtained, thus ensuring good tracking. Moreover, when the layer 3 is formed by a carbon-doped hydrogenated amorphous silicon oxide (SiCO:H), the deposition conditions of the layer 3 are preferably chosen such as to foster the formation of low-energy bonds of Si—H and Si—C type that are easily decomposable under the effect of heat.

The material of the substrate 2 is preferably chosen such as to provide a negligible quantity of gas with respect to that given off by the layer 3. This can be a material that does not degas or a material having a much higher decomposition or degassing temperature than that of the layer 3. The quantity of gas released therefore comes only from the layer 3 which then forms the main and almost sole gas source of the recording medium.

Figure 2:
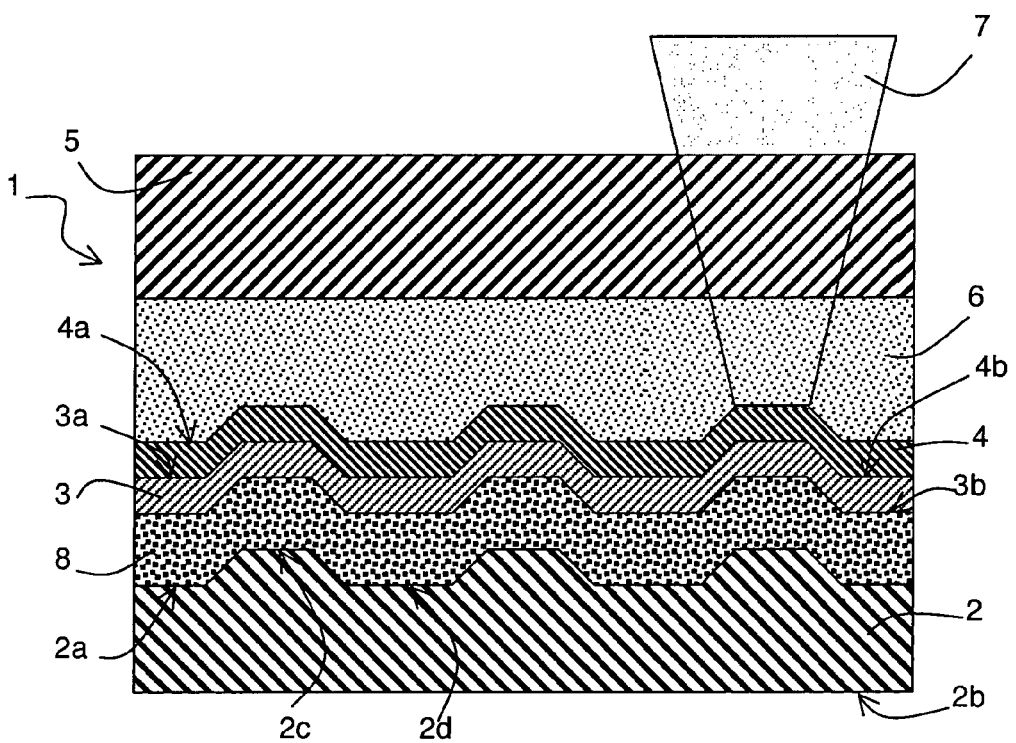
FIGS. 2 to 4 schematically represent alternative embodiments of the medium according to FIG. 1, in cross-section.

If the substrate 2 used is liable to give off a non-negligible quantity of gas, an additional layer 8 can be disposed between the layer 3 and the substrate 2, as represented in FIG. 2. The additional layer 8 is designed to limit degassing of the substrate 2 and therefore to enhance control of the quantity of gas released and therefore the height of the bubbles formed. The additional layer 8 then acts as buffer layer between the substrate 2 and the layer 3. It can for example be formed by a dielectric layer deposited by magnetron sputtering.

The layer arranged on the front face 4a of the active layer 4 through which the optical writing radiation 7 passes is preferably a deformable layer able to follow the deformations of the active layer 4 when write operations are performed. Thus, according to the embodiments represented in FIGS. 1 and 2, the adhesive layer 6 disposed between the active layer 4 and the protective layer 5 is deformable.

Figure 3:
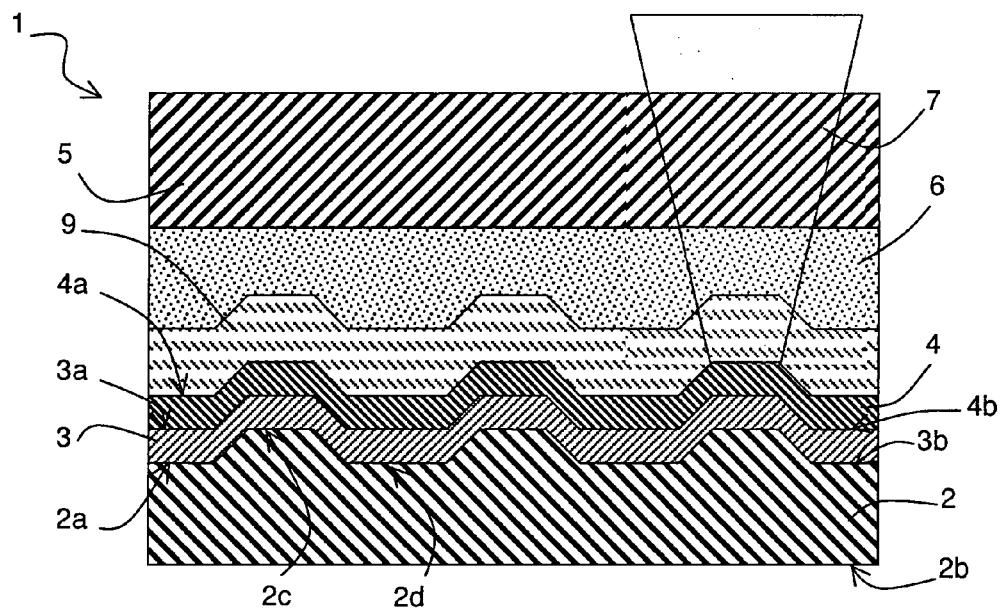

If the adhesive layer 6 is not sufficiently flexible to allow deformation of the active layer 4, an additional deformable layer 9 can be arranged on the front face 4a of the active layer 4 between the adhesive layer 6 and the active layer 4. Thus, FIGS. 3 and 4 respectively represent alternative embodiments of FIGS. 1 and 2, with a deformable layer 9 disposed between the adhesive layer 6 and the active layer 4.

Figure 4:
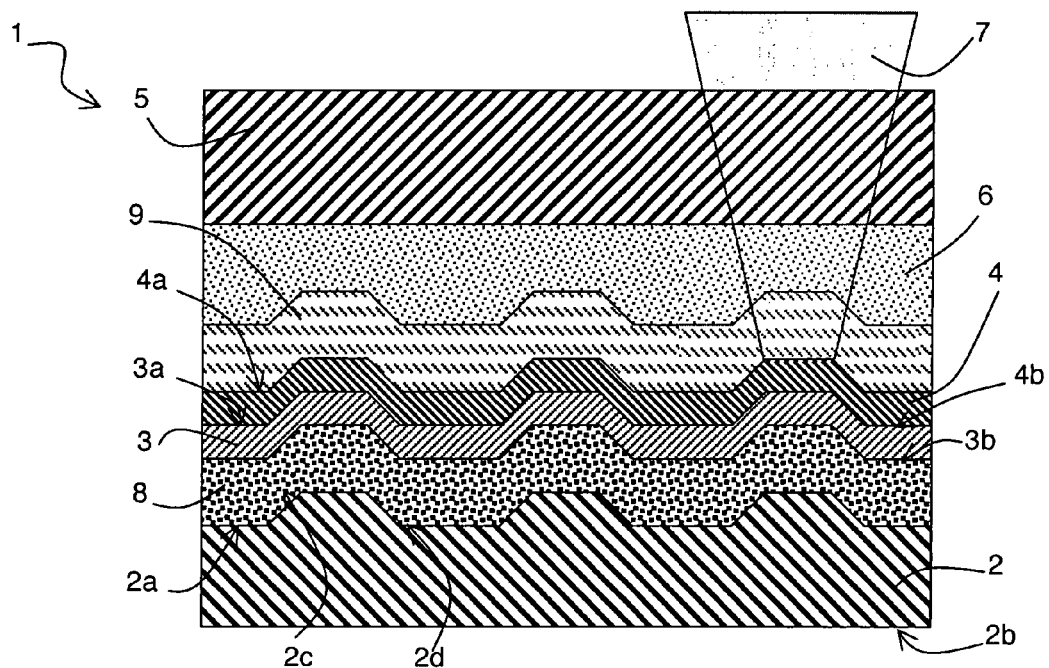

For example purposes, a recording medium as represented in FIG. 4 comprises a successive stack:
- of a polycarbonate substrate 2,
- of a buffer layer 8 of ZnS—SiO$_2$ with a thickness of 100 nm,
- of a layer 3 forming the gas source, made of SiCO:H with a thickness of 10 nm,
- of an active layer 4 of ZnTe with a thickness of 20 nm or of SnTe with a thickness of 20 nm or of a stack of two layers with a thickness of 20 nm each and respectively made of ZnTe and SnTe,
- of a 10 μm deformable layer 9 made of poly(dimethylsiloxane) or PDMS, for example of Sylgard 184® type,
- of an adhesive layer 6 of photo-crosslinkable acrylic polymer,
- and of a protective layer 5 of polycarbonate.

The height variation of the gas bubbles in such a recording medium, with a constant pulse time, is about 10 nm/mW, whereas in a recording medium comprising neither the buffer layer 8 of ZnS—SiO$_2$ nor the SiCO:H layer 3, the height variation of the bubbles is 20 nm/mW. The use of a layer forming a gas source of limited thickness therefore enables the height of the bubbles to be limited when a write operation is performed and therefore enables the sensitivity of the height of the bubbles with respect to the writing power to be limited.

In addition, the deformable layer 9 can have a thickness less than or equal to 1 micrometer, which also enables the height of the bubbles formed in the active layer to be limited.

Figure 5:
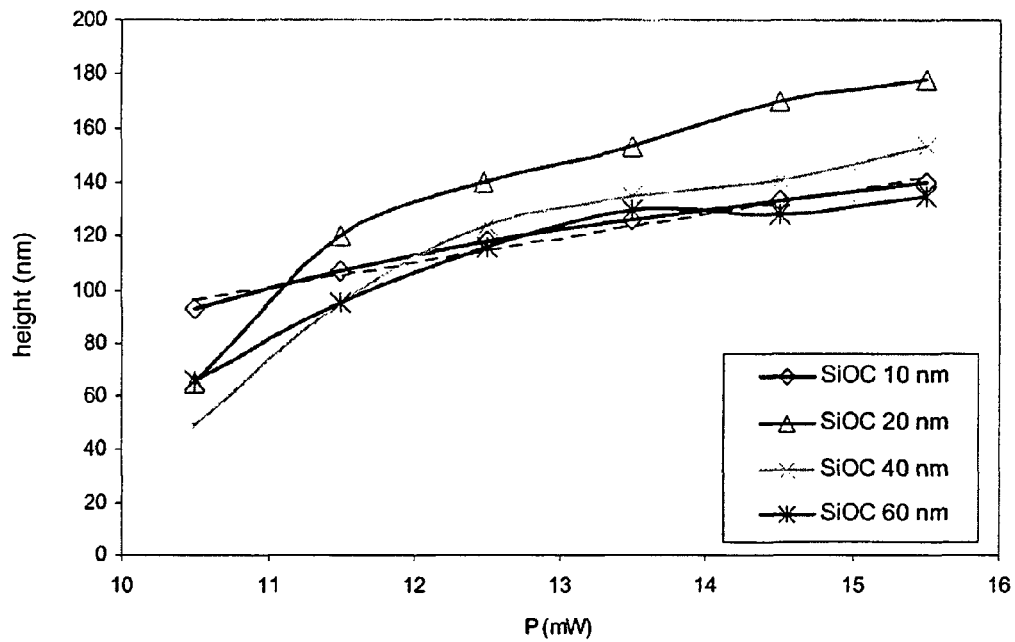
FIG. 5 represents the variation of the write power modulation versus the height of the bubbles in a medium according to FIG. 4, with a gas source layer having a thickness varying between 10 nm and 60 nm.

Write operations were performed in four recording media according to FIG. 4 with a layer 3 having a thickness respectively of 10, 20, 40 and 60 nm. Thus, FIG. 5 represents the variation of the height of a bubble made during a write operation versus the power of the laser beam observed in the different media. It can be noted that the evolution of the height of a bubble versus the power has a shallower slope for high powers than for low powers. In addition, on the curve representing a layer 3 with a thickness of 10 nm, there is no variation of slope, but the bubble has a height which increases by 10 nm per mW of laser power, which is two times less than in the case of a medium according to the prior art comprising only a polycarbonate substrate of large thickness. In the presence of the layer 3, of limited thickness, the bubbles therefore do in fact have a height that varies less quickly versus the power.

The invention is not limited to the embodiments described above. For example, as represented in FIG. 6, the irreversible optical recording medium 1 can have a structure that is inverted with respect to the structure represented in FIG. 1.

Instead of passing through the protective layer 5, the optical writing radiation 7 can in fact come from the free rear face 2a of the substrate 2 and pass through the substrate 2 before reaching the active layer 4. In this case, the front face 4a of the active layer 4 is arranged on the same side as the substrate 2.

Figure 6:
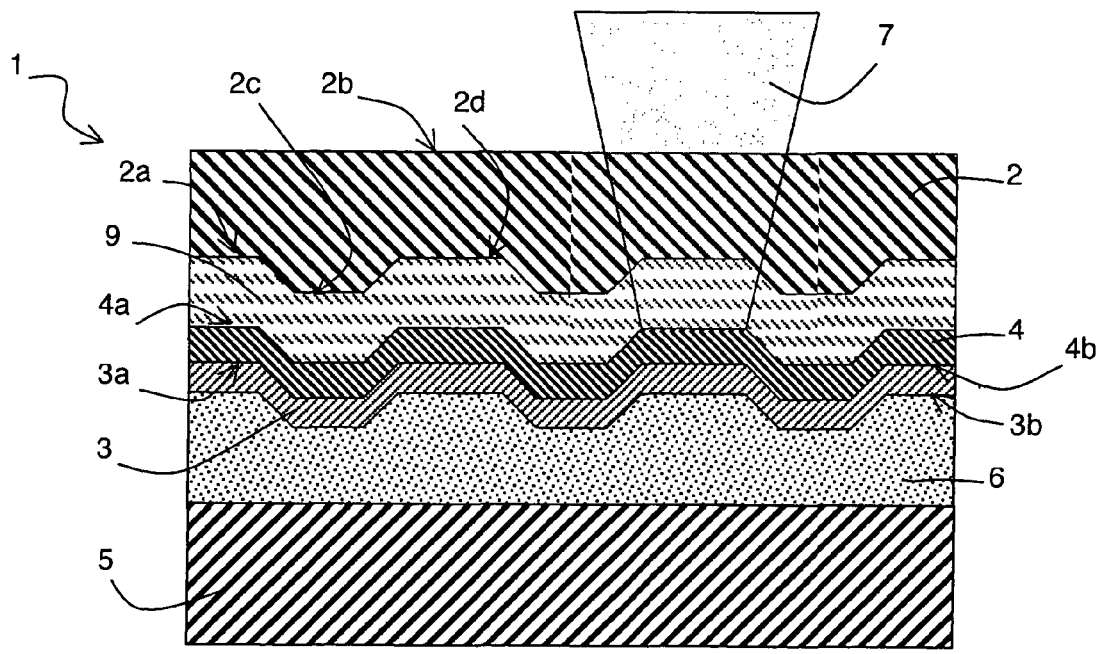
FIG. 6 schematically represents a second embodiment of an optical recording medium according to the invention, in cross-section, the layer forming the gas source being arranged between the active layer and the protective layer.

In this way, in FIG. 6, the optical data recording medium 1 comprises a stack of several superposed thin layers. The medium thus comprises a substrate 2 presenting a front face 2a provided with a track and with a free rear face 2b. The layer deformable 9, the active layer 4, the layer 3 forming the gas source and the protective layer 5 secured to the active layer 4 by the adhesive layer 6 are successively arranged on the front face 2a of the substrate. The deformable layer 9 is then arranged on the front face 4a of the active layer 4, between the substrate 2 and said active layer 4. The layer 3 forming the gas source is for its part still disposed on the rear face 4b of the active layer 4, between the active layer 4 and the adhesive layer 6.

The front face 2a of the substrate comprises raised zones 2c and pit zones 2d. The pit zones 2d preferably form a groove in the form of a spiral constituting the track of the substrate. In this way, as in the prior art, the optical writing radiation 7 comes from the rear face 2b of the substrate 2 and preferably focuses on the groove of the front face 2a of the substrate 2. Thus, when a read operation is performed, the tracking signal preferably follows the part of the active layer that covers the groove of the front face 2a of the substrate 2, i.e. the complementary or negative part of the groove, and it detects two types of zones, respectively blank and written. However, unlike the prior art, the recording medium according to FIG. 6 comprises a deformable layer 9 arranged between the substrate 2 and the active layer and also a layer forming a gas source arranged on the opposite side from the substrate. This enables bubbles to be formed at the level of the part of the active layer that covers the groove and on the side where the substrate 2 is located and not on the opposite side from the substrate 2. The tracking signal can therefore distinguish the levels of the written zones of the active layer from the other levels of the active layer, and more particularly from the levels of the blank zones of the active layer and from the levels of the part of the active layer covering the raised zones of the front face of the substrate, more easily than in a recording medium according to the prior art.

The material forming the adhesive layer 6 is preferably chosen such as to provide a negligible quantity of gas compared with that given off by the layer 3. This can be a material that does not degas or it can be a material having a much higher decomposition and/or degassing temperature than that of the layer 3. For example, the material used can be an acrylic glue able to be cross-linked by ultraviolet radiation.

Figure 7:
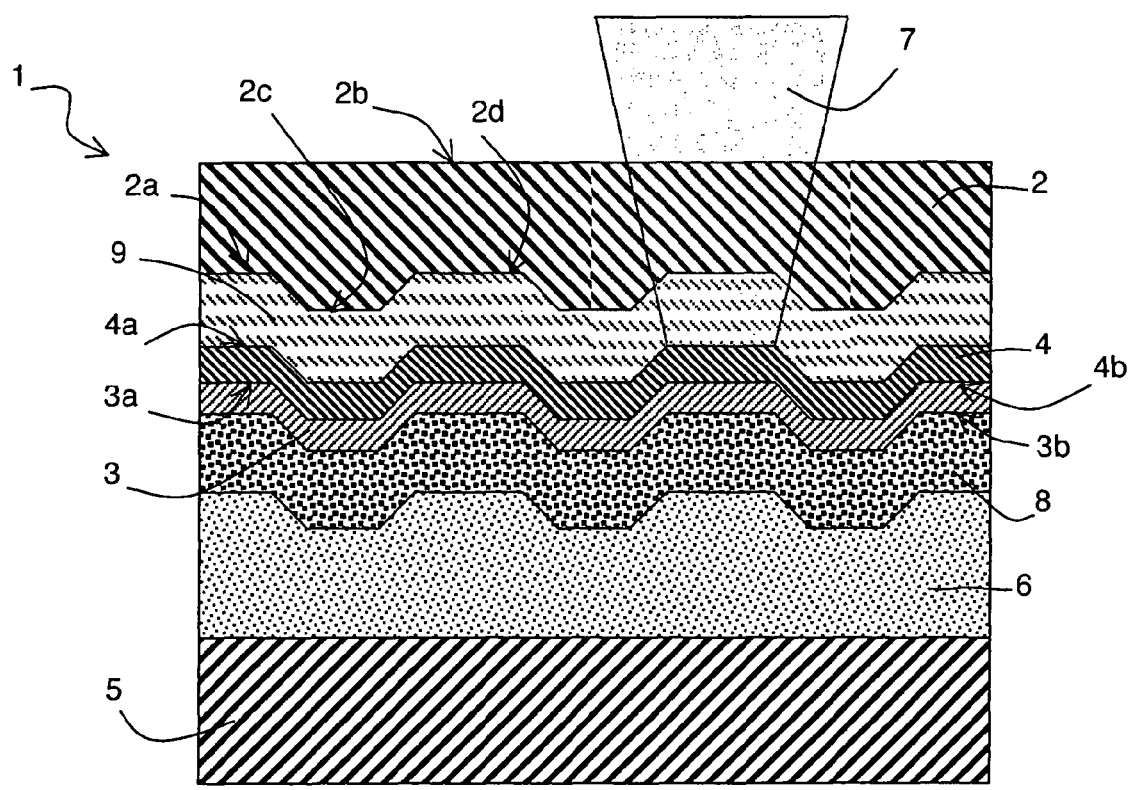
FIG. 7 schematically illustrates an alternative embodiment of the medium according to FIG. 6, in cross-section.

If the adhesive layer 6 used is liable to give off a large quantity of gas due to the action of a temperature rise, an additional layer 8 forming a buffer layer can be arranged between the layer 3 and the adhesive layer 6, as represented in FIG. 7. The additional layer 8 thus enables degassing of the adhesive layer 6 to be limited either by thermal effect or by mechanical effect. The additional layer 8 can therefore be a layer of dielectric material deposited by magnetron sputtering. The dielectric material is for example formed by 80% of ZnS and 20% of $SiO_2$.

The invention claimed is:

1. An irreversible optical recording medium comprising:
at least an active layer presenting a rear face and a front face designed to receive at least an optical writing radiation, the optical writing radiation including means of a layer forming a gas source arranged on the rear face of the active layer to enable gas bubbles to be formed locally in the active layer, wherein the layer forming the gas source has a thickness less than or equal to 100 nm, and is made of carbon-doped hydrogenated amorphous silicon oxide.

2. The medium according to claim 1, further comprising:
a protective layer; and
a substrate including a free rear face and a front face provided with a track, wherein the active layer is arranged between the protective layer and the substrate.

3. The medium according to claim 2, wherein the layer forming the gas source is arranged between the front face of the substrate and the rear face of the active layer.

4. The medium according to claim 3, further comprising a buffer additional layer arranged between the layer forming the gas source and the substrate.

5. An irreversible optical recording medium comprising:
at least an active layer presenting a rear face and a front face designed to receive at least an optical writing radiation, the optical writing radiation including means of a layer forming a gas source arranged on the rear face of the active layer to enable gas bubbles to be formed locally in the active layer, wherein the layer forming the gas source has a thickness less than or equal to 100 nm;
a protective layer; and
a substrate including a free rear face and a front face provided with a track, wherein the active layer is arranged between the protective layer and the substrate, and the layer forming the gas source is arranged between the rear face of the active layer and the protective layer.

6. The medium according to claim 5, further comprising an adhesive layer arranged between the layer forming the gas source and the protective layer.

7. The medium according to claim 6, further comprising a buffer additional layer arranged between the layer forming the gas source and the adhesive layer.

8. An irreversible optical recording medium comprising:
at least an active layer presenting a rear face and a front face designed to receive at least an optical writing radiation, said optical writing radiation including means of a layer forming a gas source arranged on the rear face of the active layer to enable gas bubbles to be formed locally in the active layer, wherein the layer forming the gas source has a thickness less than or equal to 100 nm; and
a deformable layer arranged on the front face of the active layer.

9. The medium according to claim 8, wherein the deformable layer has a thickness less than or equal to 1 micrometer.

10. The medium according to claim 8, further comprising:
a protective layer; and
a substrate including a free rear face and a front face provided with a track, wherein the active layer is arranged between the protective layer and the substrate.

11. The medium according to claim 10, wherein the layer forming the gas source is arranged between the front face of the substrate and the rear face of the active layer.

12. The medium according to claim 11, further comprising a buffer additional layer arranged between the layer forming the gas source and the substrate.

* * * * *